(12) United States Patent
Diorio (10) Patent No.: US 9,736,906 B2
(45) Date of Patent: Aug. 15, 2017

(54) CONTROL MECHANISM AND METHOD USING RGB LIGHT EMITTING DIODES

(71) Applicant: Intel Corporation, Santa Clara, CA (US)

(72) Inventor: Joseph M. Diorio, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/496,138

(22) Filed: Sep. 25, 2014

(65) Prior Publication Data

US 2016/0095173 A1    Mar. 31, 2016

(51) Int. Cl.
| | |
|---|---|
| H05B 37/02 | (2006.01) |
| G06F 3/041 | (2006.01) |
| H05B 33/08 | (2006.01) |
| G01V 8/00 | (2006.01) |

(52) U.S. Cl.
CPC ....... *H05B 33/089* (2013.01); *H05B 33/0857* (2013.01); *H05B 33/0863* (2013.01); *H05B 33/0866* (2013.01); *G01V 8/00* (2013.01)

(58) Field of Classification Search
CPC .... H05B 33/089; H05B 33/0587; G06F 3/042
See application file for complete search history.

(56) References Cited

U.S. PATENT DOCUMENTS

| | | | |
|---|---|---|---|
| 7,479,622 B2 | 1/2009 | May et al. | |
| 8,339,058 B2 | 12/2012 | Simmers | |
| 8,723,149 B2 | 5/2014 | Svajda et al. | |
| 2008/0179497 A1 | 7/2008 | Maniam et al. | |
| 2009/0256810 A1* | 10/2009 | Pasquariello | G06F 3/0421 345/173 |
| 2010/0102734 A1* | 4/2010 | Quick | G09G 3/14 315/185 R |
| 2010/0295821 A1* | 11/2010 | Chang | G06F 3/0421 345/175 |
| 2013/0292550 A1* | 11/2013 | Maxik | G01V 8/20 250/208.2 |

(Continued)

FOREIGN PATENT DOCUMENTS

| | | |
|---|---|---|
| TW | M451589 U1 | 4/2013 |
| TW | 201342157 A | 10/2013 |

OTHER PUBLICATIONS

International Search Report and Written Opinion received for PCT Patent Application No. PCT/US2015/039393, mailer on Oct. 19, 2015, 11 pages.

(Continued)

*Primary Examiner* — Douglas W Owens
*Assistant Examiner* — Raymond R Chai
(74) *Attorney, Agent, or Firm* — Intel Corporation (57) ABSTRACT

A control mechanism and method using RGB (red-green-blue) light emitting diodes (LEDs) are disclosed. A particular embodiment includes: a red-green-blue (RGB) light emitting diode (LED) having a plurality of color components, each color component being either active or inactive; and an input controller coupled to each of the plurality of color components to determine a voltage level thereon, the input controller being configured to detect a voltage change in an inactive color component when light from an active color component is reflected off of a proximate object.

8 Claims, 6 Drawing Sheets

(56) References Cited

U.S. PATENT DOCUMENTS

2014/0225529 A1    8/2014  Beczkowski

OTHER PUBLICATIONS

Office Action received for Taiwanese Patent Application No. 104127378, mailed on Oct. 14, 2016, 11 pages of Taiwanese Office Action including 1 Page of English Translation of Search Report.
International Preliminary Report on Patentability and Written Opinion received for application No. PCT/US2015/039393, dated Apr. 6, 2017, 7 pages.

* cited by examiner

CONTROL MECHANISM AND METHOD USING RGB LIGHT EMITTING DIODES

TECHNICAL FIELD

This patent application relates to electronic systems, mobile devices, and electrical devices, according to various example embodiments, and more specifically to a control mechanism and method using RGB (red-green-blue) light emitting diodes (LEDs).

BACKGROUND

A light-emitting diode (LED) is typically implemented as a two-lead semiconductor light source. An LED resembles a basic pn-junction diode, which emits light when activated. When a fitting voltage is applied to the leads, electrons are able to recombine with electron holes within the device, releasing energy in the form of photons. This effect is called electroluminescence, and the color of the light, corresponding to the energy of the photon, is determined by the energy band gap of the semiconductor. An LED is often small in area (e.g., less than 1 $mm^2$), and integrated optical components may be used to shape its radiation pattern.

White light can be formed by mixing differently colored lights. The most common method is to use red, green, and blue (RGB); hence, the method is called multi-color white LEDs (sometimes referred to as RGB LEDs). RGB LEDs are commonly made to include three color components, a red LED component, a green LED component, and a blue LED component. The three color components can be separately lit to produce a desired color combination, including white light. The three color components can be combined into a single package and controlled as a combined RGB LED unit. RGB LEDs need electronic circuits to control the blending and diffusion of different colors by activating (or inactivating) the three color LED components. The individual color LED components typically have slightly different emission patterns leading to a variation of the color depending on direction. RGB LEDs are particularly interesting in many applications, because of the flexibility of mixing different colors. This mechanism also has higher quantum efficiency in producing white light by combining the red, green, and blue colors.

However, LEDs and RGB LEDs are mainly used as light-producing elements in various forms of information and image displays, televisions, computer monitors, mobile device displays, and the like. As such, conventional LEDs and RGB LEDs serve mainly as output devices and not as input or control devices.

BRIEF DESCRIPTION OF THE DRAWINGS

The various embodiments are illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

In various example embodiments as described herein, a control mechanism and method using RGB (red-green-blue) light emitting diodes (LEDs) are disclosed. In example embodiments, RGB LEDs are configured as control devices, input devices, and user input buttons for touchscreens and other electronic devices. Unlike the conventional technology that uses LEDs and RGB LEDs as only output devices, the presently disclosed embodiments use RGB LEDs as a control and user input mechanism in addition to their standard use as output devices. In a variety of applications, the control and user input mechanism of the various embodiments described herein can be used as an input mechanism in a variety of electronic devices that use arrays of LEDs and/or RGB LEDs. In the various embodiments described herein, the electronic devices can include mobile computing or communication devices, desktop computing devices, laptop computers, ultrabook computers, detachables, handheld computers, portable devices, wearable computers, touch screen systems, tablet computing systems, Personal Digital Assistants (PDAs), cellular telephones, smartphones, web appliances, and other electronic devices typically including some form of visual display device. Given that the various embodiments described herein can use RGB LEDs as both input and output mechanisms, electronic devices incorporating the disclosed technology can be produced with increased functionality, yet with fewer parts and less cost.

In the various example embodiments described herein, an RGB LED can be used as a control and user input mechanism by lighting one or more of its color LED components and measuring the voltage or voltage changes that occur on the other non-lighted LED components. If light emitted from a lit color LED component reflects back to a non-lighted LED component, the voltage on the non-lighted LED component changes as compared to the voltage on the non-lighted LED component when no reflected light is received. Thus, the voltage change at the non-lighted LED component can be used to detect the presence or absence of reflected light. This effect on the non-lighted LED components of an RGB LED can be used to detect the presence of an object in proximity to the RGB LED given that light from a lit LED component of the RGB LED will reflect off of the object and onto other non-lighted LED components. For example, if a user's finger is placed in proximity to an RGB LED with at least one color LED component lit, the reflection of the light off the finger will change the voltage in the non-lighted LED component(s). This voltage change can be used to determine a 'button press' (e.g., a control or user input activation) and/or the location of the user's finger. Importantly, the detection of the proximate object (e.g., the control or user input activation and/or the presence and location of the user's finger) in the various embodiments described herein does not require the object to physically touch the RGB LED or the associated display screen. Moreover, the various embodiments do not depend on electrical capacitance or resistance, so no special 'stylus' or specialized embedded hardware is needed. Additionally, because the various embodiments described herein use the light reflected off of a proximate object, the button activation and/or the presence and location of the user's finger can be detected even if the user is wearing gloves or using an object other than a finger to effect the user input action. RGB LEDs are generally used with pulse width modulation (PWM) to produce various colors by rapidly activating and inactivating the three color LED components to produce desired color combinations. During this rapid switching of the three color LED components, the unused (non-lighted) LED color components can be used as control inputs by measuring voltage changes produced by the received light. This voltage measurement will vary if the user's finger (or other proximate object) is near the source of the light. As a result, the voltage change can be used to register a control or user input. The details of various example embodiments are described below.

Figure 1:
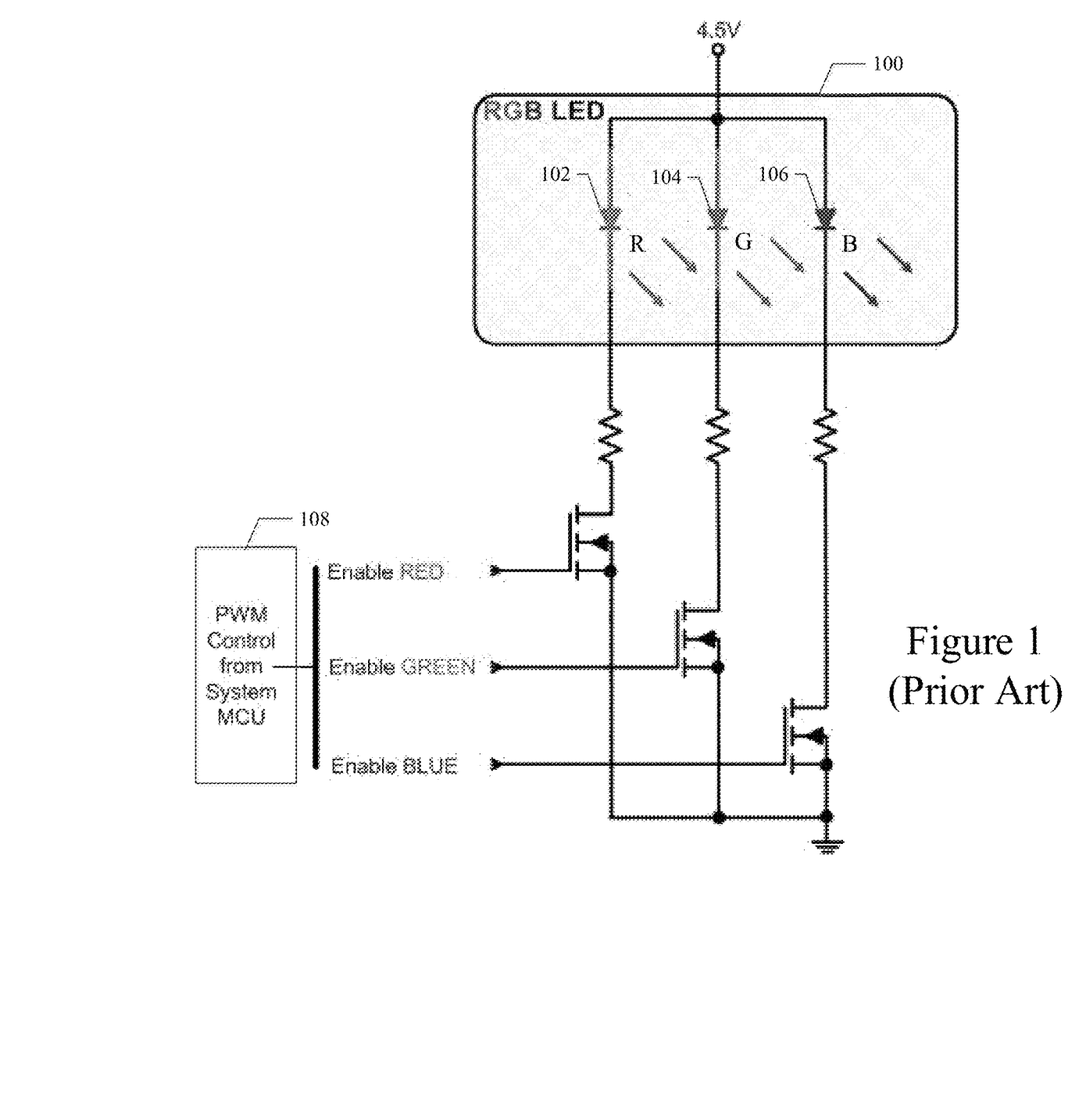
FIG. 1 illustrates the structure of a conventional RGB LED.

Referring now to FIG. 1, the structure of a conventional RGB LED 100 is illustrated. RGB LEDs are commonly made to include three color components, a red LED component 102, a green LED component 104, and a blue LED component 106. The three color components 102, 104, and 106 can be separately lit to produce a desired color combination, including white light. The three color components can be combined into a single package 100 and the light output of the package 100 can be controlled as a combined RGB LED unit by a control module 108. RGB LEDs need electronic circuits to control the blending and diffusion of different colors by activating (or inactivating) the three color LED components. Control module 108 is provided for this purpose. RGB LEDs are generally used with pulse width modulation (PWM) as controlled by control module 108 to produce various colors by rapidly activating and inactivating the three color LED components to produce desired color output combinations. Arrays of RGB LEDs, like RGB LED 100, can be assembled using well-known techniques to produce display screens or monitors for computing, communication, or entertainment devices or other electronic devices.

Figure 2:
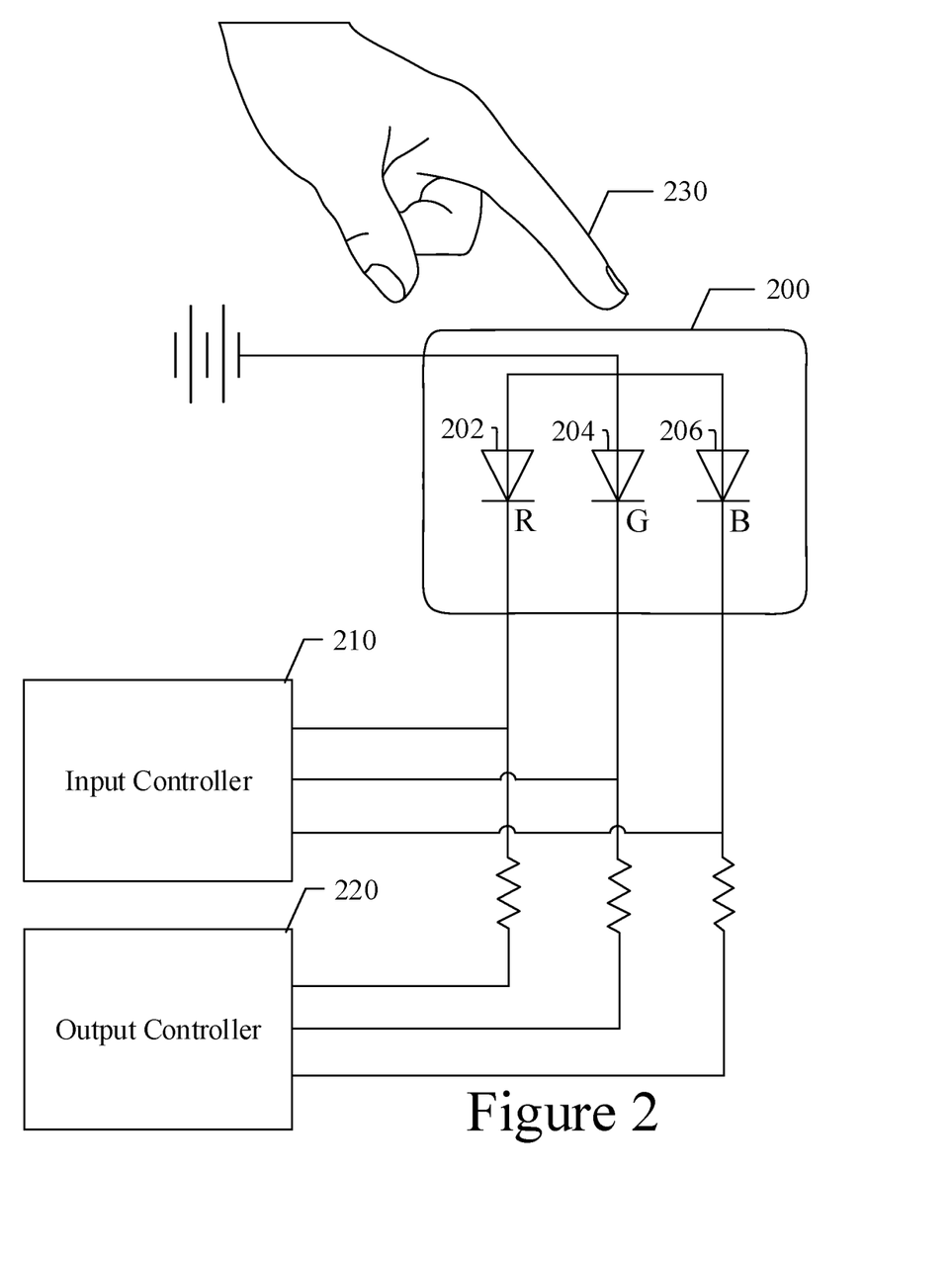
FIG. 2 illustrates an example embodiment of a control mechanism using RGB LEDs.

Referring now to FIG. 2, the diagram illustrates an example embodiment of a control mechanism using RGB LEDs. In a similar arrangement as shown in FIG. 1 and described above, the example embodiment shown in FIG. 2 includes an RGB LED 200 including three color components, a red LED component 202, a green LED component 204, and a blue LED component 206. The three color components 202, 204, and 206 are combined into a single package 200 and the light output of the package 200 can be controlled as a combined RGB LED unit by output controller 220 as described above.

The embodiment shown in FIG. 2 also includes an input controller 210. The input controller 210 is coupled to the electrical leads of each of the three color components 202, 204, and 206 of RGB LED 200 as shown in FIG. 2. In this configuration, the input controller 210 can sample the voltage present on each of the three electrical leads of color components 202, 204, and 206. As a result, the input controller 210 can determine at any point in time which of the color components 202, 204, and 206 are lighted (active) and which are non-lighted (inactive). Additionally, the input controller 210 can detect any change in voltage levels that may occur on any of the inactive color components 202, 204, and 206 over time. If there is no object in proximity to the RGB LED 200 that may cause a variation in reflected light, the voltage level present on a particular inactive color component (e.g., 202, 204, or 206) will be substantially the same as the voltage level sampled for the same inactive color component at a previous point in time. Thus, with no object in proximity to the RGB LED 200, the voltage levels on the inactive color components 202, 204, and 206 will remain substantially consistent over time. These voltage levels can be periodically sampled and retained by the input controller 210. As long as the voltage levels on the inactive color components 202, 204, and 206 remain substantially consistent, the input controller 210 can conclude (and suppress related signaling) that no user input or button activation has been received at the RGB LED 200. The input controller 210 can be implemented using standard discrete logic components, semiconductor logic, application-specific integrated circuits (ASIC), field programmable gate array (FPGA) components, or any of a variety of conventional electronic components and techniques.

Figure 3:
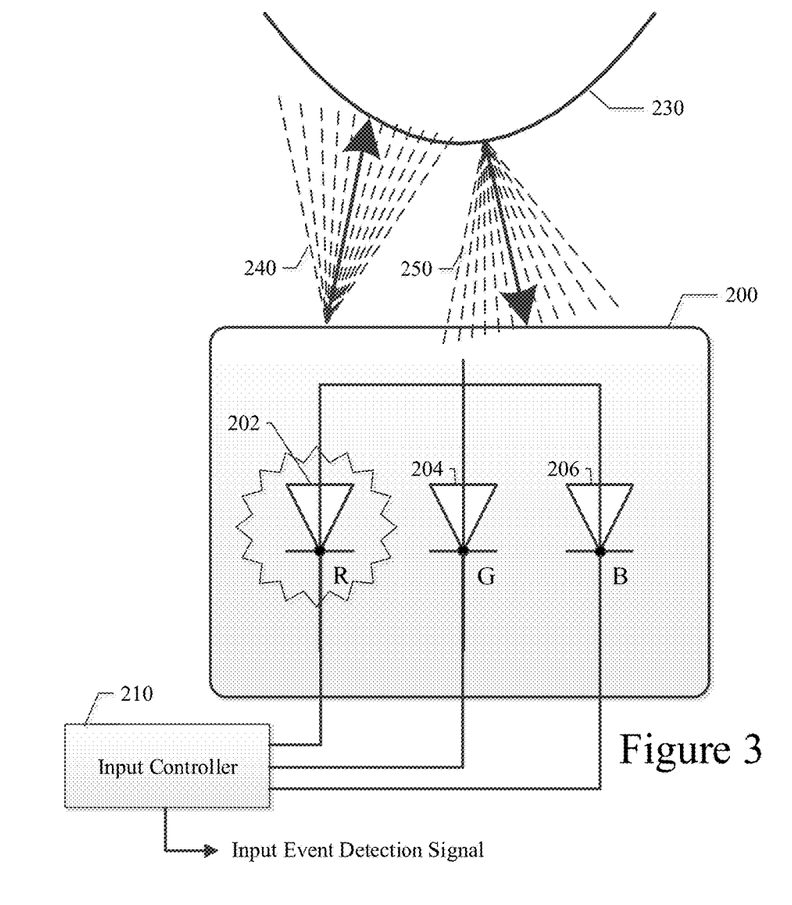
FIGS. 3 and 4 illustrate the light reflection effect of an object in proximity to a lit color component of an RGB LED.
Figure 4:
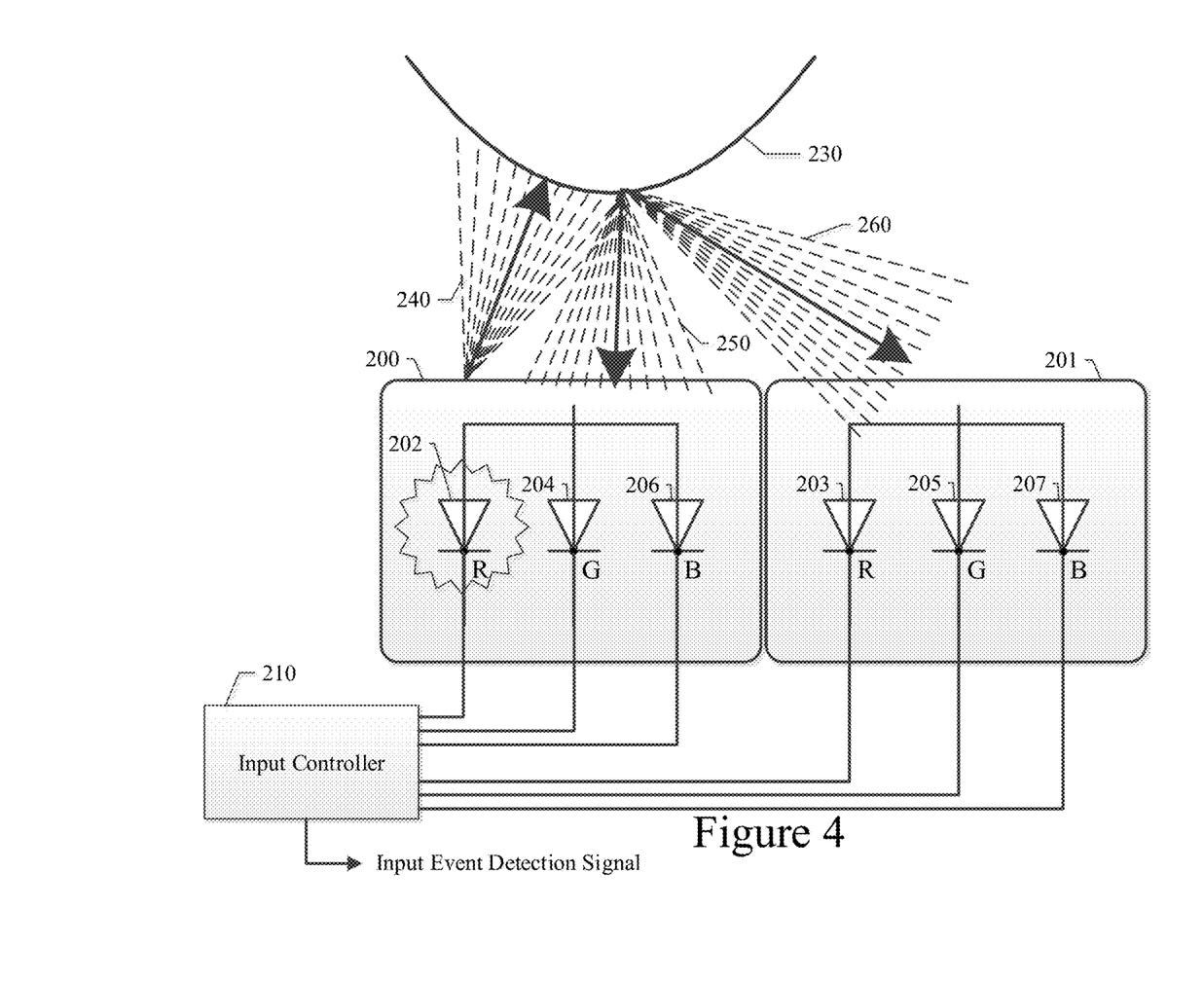

Referring again to FIG. 2, the diagram shows a user moving a finger (or other object) 230 into proximity of the RGB LED 200. By moving a finger or object 230 into proximity of the RGB LED 200, a variation in reflected light from a lit color component of RGB LED 200 is received by the non-lighted (inactive) color components. As a result, the voltage levels present on the inactive color components (e.g., 202, 204, or 206) change. This voltage level change can be detected by the input controller 210. FIGS. 3 and 4 illustrate this voltage change effect in more detail as described below.

Referring now to FIG. 3, the diagram illustrates the light reflection effect of an object in proximity to a lit color component of an RGB LED. As shown, a user has moved a finger (or other object) 230 into proximity of the RGB LED 200. In the example of FIG. 3, we assume for purposes of explanation, that the red color component 202 is lit (active) and the resulting light rays 240 are emanating out of the RGB LED 200 and upward toward the proximate object 230. In the example of FIG. 3, we also assume for purposes of explanation, that the green color component 204 and the blue color component 206 are not lighted (inactive). It will be apparent to those of ordinary skill in the art in view of the disclosure herein that any of the color components (e.g., 202, 204, or 206) or combinations thereof can be lit (active) as long as at least one of the color components is not lighted (inactive). The light rays 240 emanating out of the RGB LED 200 from the lighted (active) color components radiate upward toward the proximate object 230. Some of the light rays are reflected back as reflected light rays 250. These reflected light rays 250 radiate toward the inactive color components 204 and 206 and serve to alter the light level surrounding the inactive color components 204 and 206. As a result, the voltage in each of the inactive color components 204 and 206 changes relative to a voltage sampled for the same inactive color component at a previous point in time. This voltage level change can be detected by the input controller 210. The voltage level change detected by the input controller 210 can be associated with a control input, user input, or button activation event. In this manner, the input controller 210 can monitor the voltage levels on the inactive color components of an RGB LED to detect a control input, a user input activation, a button activation, or other input event. The input event can be signaled to other components of an electronic device via an input event detection signal. The detection of these input events does not affect the usage of the RGB LEDs as output devices.

Referring now to FIG. 4, the diagram illustrates another example of the light reflection effect of an object in proximity to a lit (active) color component of an RGB LED. In a similar manner as shown in FIG. 3 and described above, a user has moved a finger (or other object) 230 into proximity of the RGB LED 200. In the example of FIG. 4, we again assume for purposes of explanation, that the red color component 202 is lit (active) and the resulting light rays 240 are emanating out of the RGB LED 200 and upward toward the proximate object 230. In the example of FIG. 4, we also assume for purposes of explanation, that the green color component 204 and the blue color component 206 of RGB LED 200 are not lighted (inactive) and that all three of the color components 203, 205, and 207 of a neighboring RGB LED 201 are also not lighted (inactive). It will be apparent to those of ordinary skill in the art in view of the disclosure herein that any of the color components (e.g., 202 through 207) or combinations thereof can be lit (active) as long as at least one of the color components is not lighted (inactive). The light rays 240 emanating out of the RGB LED 200 from the lighted (active) color components radiate upward toward the proximate object 230. Some of the light rays are reflected back as reflected light rays 250 and 260. The reflected light rays 250 radiate toward the inactive color components 204 and 206 of RGB LED 200 and serve to alter the light level surrounding the inactive color components 204 and 206. The reflected light rays 260 radiate toward the inactive color components 203, 205, and 207 of neighboring RGB LED 201 and serve to alter the light level surrounding the inactive color components 203, 205, and 207. As a result, the voltage in each of the inactive color components 203 through 207 changes relative to a voltage sampled for the same inactive color component at a previous point in time. This voltage level change can be detected by the input controller 210. The voltage level change detected by the input controller 210 can be associated with a control input, a user input, or a button activation event. In this manner, the input controller 210 can monitor the voltage levels on the inactive color components of a plurality of RGB LEDs in an RGB LED array, including the inactive color components of a primary RGB LED and the inactive color components of neighboring RGB LEDs to detect a control input, a user input activation, a button activation, or other input event. Additionally, because the input controller 210 can also determine which RGB LED(s) in an array of RGB LEDs detected the input event, the input controller 210 can also determine the physical location in the RGB LED array where the input event was detected. As a result, the input controller of the example embodiment can detect the input event and the location of the input event. Moreover, the detection of the input event (e.g., the presence of a proximate object) in the various embodiments described herein does not require the object to physically touch the RGB LED or the associated display screen. The object only needs to be close enough to the RGB LED so the light reflectance effect described above can be detected by the input controller 210.

Figure 5:
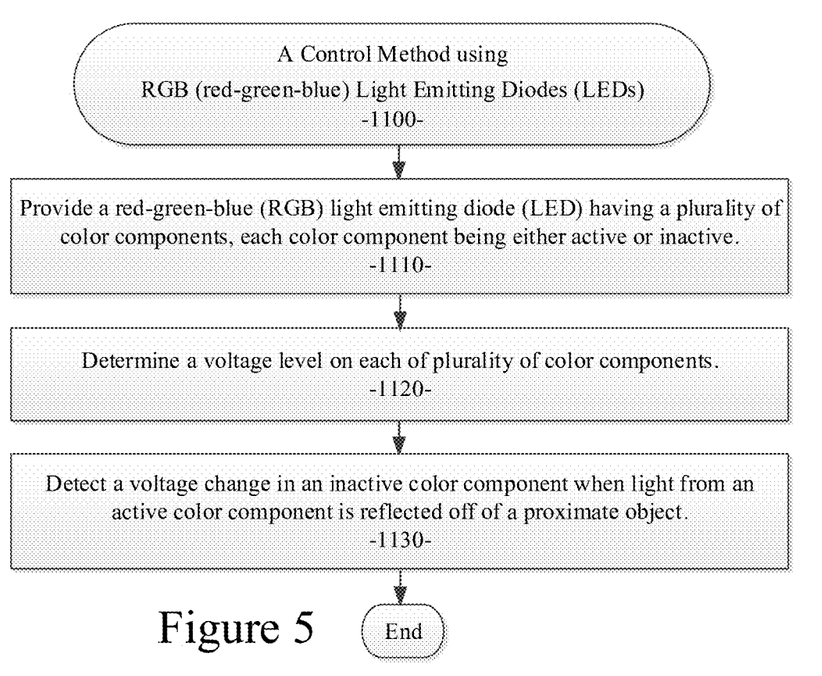
FIG. 5 is a processing flow chart illustrating an example embodiment of a method as described herein.

Referring now to FIG. 5, a processing flow diagram illustrates an example embodiment of a control method 1100 as described herein. The method 1100 of an example embodiment includes: providing a red-green-blue (RGB) light emitting diode (LED) having a plurality of color components, each color component being either active or inactive (processing block 1110); determining a voltage level on each of plurality of color components (processing block 1120); and detecting a voltage change in an inactive color component when light from an active color component is reflected off of a proximate object (processing block 1130).

Figure 6:
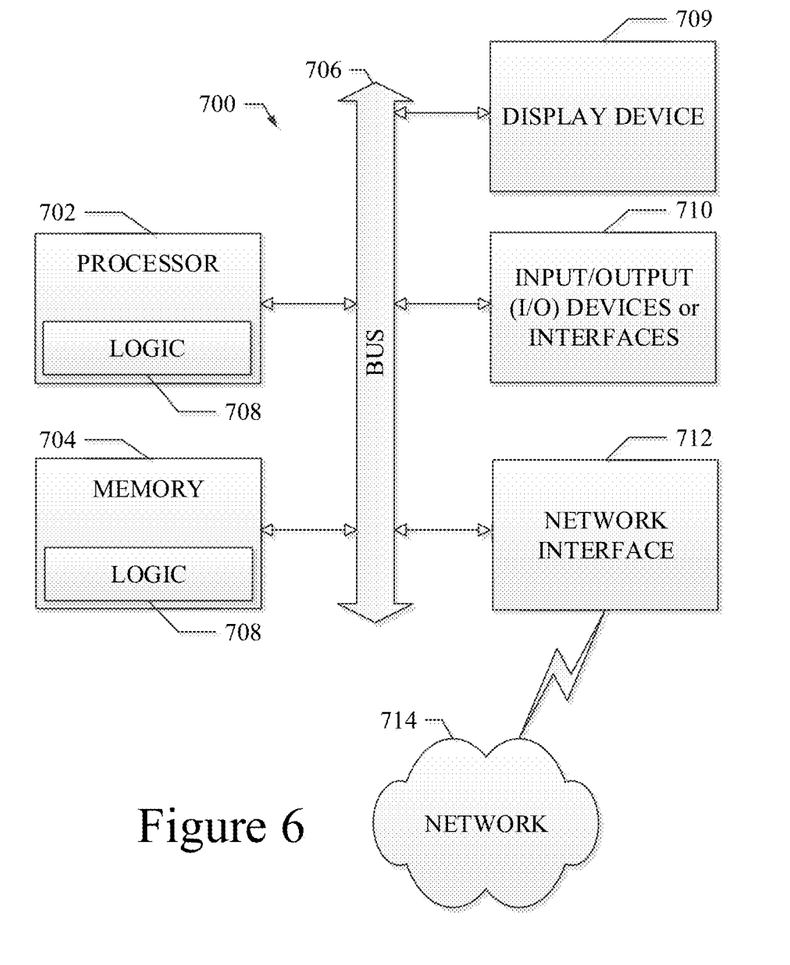
FIG. 6 shows a diagrammatic representation of a machine in the example form of a mobile computing and/or communication system within which a set of instructions when executed and/or processing logic when activated may cause the machine to perform any one or more of the methodologies described and/or claimed herein.

FIG. 6 shows a diagrammatic representation of a machine in the example form of a mobile computing and/or communication system 700 within which a set of instructions when executed and/or processing logic when activated may cause the machine to perform any one or more of the methodologies described and/or claimed herein. Additionally, the control mechanism and method using RGB LEDs as disclosed herein can be used in the display device of the mobile computing and/or communication system 700. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example mobile computing and/or communication system 700 includes a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include a display device 709, and various input/output (I/O) devices and/or interfaces 710, such as audio devices, and optionally a network interface 712. The control mechanism and method using RGB LEDs as disclosed herein can be used in or with the display device 709. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth, IEEE 802.11x, and the like. In essence, network interface 712 may include or support virtually any wired and/or wireless communication mechanisms by which information may travel between the mobile computing and/or communication system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

In various embodiments as described herein, example embodiments include at least the following examples.

A control mechanism for an electronic device, the control mechanism comprising: a red-green-blue (RGB) light emitting diode (LED) having a plurality of color components, each color component being either active or inactive; and an input controller coupled to each of the plurality of color components to determine a voltage level thereon, the input controller being configured to detect a voltage change in an inactive color component when light from an active color component is reflected off of a proximate object.

The control mechanism as claimed above wherein the plurality of color components further including a red color component, a green color component, and a blue color component.

The control mechanism as claimed above further including an output controller for controlling the light output produced by the RGB LED.

The control mechanism as claimed above wherein the input controller is configured to periodically sample the voltage level of each of the plurality of color components.

The control mechanism as claimed above wherein the input controller is configured to determine which of the plurality of color components is inactive.

The control mechanism as claimed above wherein the input controller is configured to signal an input event detection to other components of the electronic device via an input event detection signal.

An electronic device comprising: a display screen coupled to a processor, the display screen including an array of red-green-blue (RGB) light emitting diodes (LEDs), each having a plurality of color components, each color component being either active or inactive; and an input controller coupled to each of the plurality of color components of the RGB LED array to determine a voltage level on each of the plurality of color components, the input controller being configured to detect a voltage change in an inactive color component when light from an active color component is reflected off of a proximate object.

The electronic device as claimed above wherein the plurality of color components further including a red color component, a green color component, and a blue color component.

The electronic device as claimed above further including an output controller for controlling the light output produced by the array of RGB LEDs.

The electronic device as claimed above wherein the input controller is configured to periodically sample the voltage level of each of the plurality of color components.

The electronic device as claimed above wherein the input controller is configured to determine which of the plurality of color components is inactive.

The electronic device as claimed above wherein the input controller is configured to signal an input event detection to other components of the electronic device via an input event detection signal.

The electronic device as claimed above wherein the electronic device is of a type from the group consisting of: a mobile computing or communication device, a desktop computing device, a laptop computer, an ultrabook computer, a detachable computing device, a handheld computer, a portable device, a wearable computer, a touch screen system, a tablet computing system, a Personal Digital Assistant (PDA), a cellular telephone, a smartphone, a web appliance, and an electronic device including a visual display device.

A method comprising: providing a red-green-blue (RGB) light emitting diode (LED) having a plurality of color components, each color component being either active or inactive; determining a voltage level on each of plurality of color components; and detecting a voltage change in an inactive color component when light from an active color component is reflected off of a proximate object.

The method as claimed above wherein the plurality of color components further including a red color component, a green color component, and a blue color component.

The method as claimed above further including controlling the light output produced by the RGB LED.

The method as claimed above including periodically sampling the voltage level of each of the plurality of color components.

The method as claimed above including determining which of the plurality of color components is inactive.

The method as claimed above including signaling an input event detection to other components of an electronic device via an input event detection signal.

The method as claimed above wherein the electronic device is of a type from the group consisting of: a mobile computing or communication device, a desktop computing device, a laptop computer, an ultrabook computer, a detachable computing device, a handheld computer, a portable device, a wearable computer, a touch screen system, a tablet computing system, a Personal Digital Assistant (PDA), a cellular telephone, a smartphone, a web appliance, and an electronic device including a visual display device.

An apparatus comprising: a light emitting diode (LED) means having a plurality of color components, each color component being either active or inactive; and an input control means coupled to each of the plurality of color components to determine a voltage level thereon, the input control means being configured to detect a voltage change in an inactive color component when light from an active color component is reflected off of a proximate object.

The apparatus as claimed above wherein the plurality of color components further including a red color component, a green color component, and a blue color component.

The apparatus as claimed above further including an output control means for controlling the light output produced by the LED.

The apparatus as claimed above wherein the input control means is configured to periodically sample the voltage level of each of the plurality of color components.

The apparatus as claimed above wherein the input control means is configured to determine which of the plurality of color components is inactive.

The apparatus as claimed above wherein the input control means is configured to signal an input event detection to other components of an electronic device via an input event detection signal.

A non-transitory machine-useable storage medium embodying instructions which, when executed by a machine, cause the machine to: provide a red-green-blue (RGB) light emitting diode (LED) having a plurality of color components, each color component being either active or inactive; determine a voltage level on each of plurality of color components; and detect a voltage change in an inactive color component when light from an active color component is reflected off of a proximate object.

The machine-useable storage medium as claimed above wherein the plurality of color components further including a red color component, a green color component, and a blue color component.

The machine-useable storage medium as claimed above being further configured to control the light output produced by the RGB LED.

The machine-useable storage medium as claimed above being further configured to periodically sample the voltage level of each of the plurality of color components.

The machine-useable storage medium as claimed above being further configured to determine which of the plurality of color components is inactive.

The machine-useable storage medium as claimed above being further configured to signal an input event detection to other components of an electronic device via an input event detection signal.

The machine-useable storage medium as claimed above wherein the electronic device is of a type from the group consisting of: a mobile computing or communication device, a desktop computing device, a laptop computer, an ultrabook computer, a detachable computing device, a handheld computer, a portable device, a wearable computer, a touch screen system, a tablet computing system, a Personal Digital Assistant (PDA), a cellular telephone, a smartphone, a web appliance, and an electronic device including a visual display device.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A control mechanism for an electronic device, the control mechanism comprising:
    a red-green-blue (RGB) light emitting diode (LED) having a plurality of color components, each color component being either active or inactive, the plurality of color components being combined into a single package having a plurality of electrical leads extending therefrom, the plurality of electrical leads corresponding to each of the plurality of color components of the single package;
    an output controller coupled to each of the plurality of color components and configured to use pulse width modulation (PWM) to produce various colors in the RGB LED by rapidly activating and inactivating the plurality of color components to produce desired color combinations; and
    an input controller coupled to each of the plurality of color components configured to, during the PWM of the RGB LED,
        periodically sample a voltage level present on each of the plurality of electrical leads and to determine at any point in time which of the plurality of color components of the single package are active and inactive,
        periodically sample an inactive color component voltage level present on an inactive color component while the color component is inactive,
        retain at least one previously sampled inactive color component voltage level for the inactive color component,
        determine if the inactive color component voltage level is substantially the same as the previously sampled inactive color component voltage level for the same inactive color component to determine a voltage change in the inactive color component when light from an active color component is reflected off a proximate object, and
        signal an input event detection to other components of the electronic device via an input event detection signal, the input event detection being signaled upon detection of the voltage change in the inactive color component, the input event detection corresponding to a user input applied to a touchscreen display of the electronic device, the input event detection including an indication of a location of the user input on the touchscreen display.

2. The control mechanism of claim 1 wherein the electronic device is of a type from the group consisting of: a mobile computing or communication device, a desktop computing device, a laptop computer, an ultrabook computer, a detachable computing device, a handheld computer, a portable device, a wearable computer, a touch screen system, a tablet computing system, a Personal Digital Assistant (PDA), a cellular telephone, a smartphone, a web appliance, and an electronic device including a visual display device.

3. An electronic device comprising:
    a touchscreen display coupled to a processor, the touchscreen display including an array of red-green-blue (RGB) light emitting diodes (LEDs), each having a plurality of color components, each color component being either active or inactive, the plurality of color components being combined into a single package having a plurality of electrical leads extending therefrom, the plurality of electrical leads corresponding to each of the plurality of color components of the single package;
    an output controller coupled to each of the plurality of color components and configured to use pulse width modulation (PWM) to produce various colors in the RGB LED by rapidly activating and inactivating the plurality of color components to produce desired color combinations; and
    an input controller coupled to each of the plurality of color components configured to, during the PWM of the RGB LED, periodically sample a voltage level present on each of the plurality of electrical leads and to determine at any point in time which of the plurality of color components of the single package are active and inactive, periodically sample an inactive color component voltage level present on an inactive color component while the color component is inactive, retain at least one previously sampled inactive color component voltage level for the inactive color component, determine if the inactive color component voltage level is substantially the same as the previously sampled inactive color component voltage level for the same inactive color component to determine a voltage change in the inactive color component when light from an active color component is reflected off a proximate object, and signal an input event detection to other components of the electronic device via an input event detection signal, the input event detection being signaled upon detection of the voltage change in the inactive color component, the input event detection corresponding to a user input applied to the touchscreen display of the electronic device, the input event detection including an indication of a location of the user input on the touchscreen display.

4. The electronic device as claimed in claim 3 wherein the electronic device is of a type from the group consisting of: a mobile computing or communication device, a desktop computing device, a laptop computer, an ultrabook computer, a detachable computing device, a handheld computer, a portable device, a wearable computer, a touch screen system, a tablet computing system, a Personal Digital Assistant (PDA), a cellular telephone, a smartphone, a web appliance, and an electronic device including a visual display device.

5. A non-transitory machine-useable storage medium embodying instructions which, when executed by a machine, cause the machine to:

control a red-green-blue (RGB) light emitting diode (LED) having a plurality of color components, each color component being either active or inactive, the plurality of color components being combined into a single package having a plurality of electrical leads extending therefrom, the plurality of electrical leads corresponding to each of the plurality of color components of the single package;

use pulse width modulation (PWM) to produce various colors in the RGB LED by rapidly activating and inactivating the plurality of color components to produce desired color combinations;

periodically sample, during the PWM of the RGB LED, a voltage level present on each of the plurality of electrical leads and determine at any point in time which of the plurality of color components of the single package are active and inactive;

periodically sample an inactive color component voltage level present on an inactive color component while the color component is inactive;

retain at least one previously sampled inactive color component voltage level for the inactive color component;

determine if the inactive color component voltage level is substantially the same as the previously sampled inactive color component voltage level for the same inactive color component to determine a voltage change in the inactive color component when light from an active color component is reflected off a proximate object; and signal an input event detection to other components of an electronic device via an input event detection signal, the input event detection being signaled upon detection of the voltage change in the inactive color component, the input event detection corresponding to a user input applied to a touchscreen display of the electronic device, the input event detection including an indication of a location of the user input on the touchscreen display.

6. The non-transitory machine-useable storage medium of claim 5 wherein the electronic device is of a type from the group consisting of: a mobile computing or communication device, a desktop computing device, a laptop computer, an ultrabook computer, a detachable computing device, a handheld computer, a portable device, a wearable computer, a touch screen system, a tablet computing system, a Personal Digital Assistant (PDA), a cellular telephone, a smartphone, a web appliance, and an electronic device including a visual display device.

7. An apparatus comprising:

a red-green-blue (RGB) light emitting diode (LED) having a plurality of color components, each color component being either active or inactive, the plurality of color components being combined into a single package having a plurality of electrical leads extending therefrom, the plurality of electrical leads corresponding to each of the plurality of color components of the single package;

an output control means coupled to each of the plurality of color components and configured to use pulse width modulation (PWM) to produce various colors in the RGB LED by rapidly activating and inactivating the plurality of color components to produce desired color combinations; and an input control means coupled to each of the plurality of color components configured to, during the PWM of the RGB LED, periodically sample a voltage level present on each of the plurality of electrical leads and to determine at any point in time which of the plurality of color components of the single package are active and inactive, periodically sample an inactive color component voltage level present on an inactive color component while the color component is inactive, retain at least one previously sampled inactive color component voltage level for the inactive color component, determine if the inactive color component voltage level is substantially the same as the previously sampled inactive color component voltage level for the same inactive color component to determine a voltage change in the inactive color component when light from an active color component is reflected off a proximate object, and signal an input event detection to other components of an electronic device via an input event detection signal, the input event detection being signaled upon detection of the voltage change in the inactive color component, the input event detection corresponding to a user input applied to a touchscreen display of the electronic device, the input event detection including an indication of a location of the user input on the touchscreen display.

8. The apparatus of claim 7 wherein the electronic device is of a type from the group consisting of: a mobile computing or communication device, a desktop computing device, a laptop computer, an ultrabook computer, a detachable computing device, a handheld computer, a portable device, a wearable computer, a touch screen system, a tablet computing system, a Personal Digital Assistant (PDA), a cellular telephone, a smartphone, a web appliance, and an electronic device including a visual display device.

* * * * *